April 17, 1956 G. H. RIDINGS 2,742,526

TWO-WAY FACSIMILE SYSTEM WITH IMPROPER OPERATION ALARM

Filed Aug. 8, 1951 3 Sheets-Sheet 1

INVENTOR.
G. H. RIDINGS

BY A. A. Thomas

ATTORNEY

TWO-WAY FACSIMILE SYSTEM WITH IMPROPER OPERATION ALARM

Filed Aug. 8, 1951 3 Sheets-Sheet 2

INVENTOR.
G. H. RIDINGS

BY A. A. Thomas

ATTORNEY

TWO-WAY FACSIMILE SYSTEM WITH IMPROPER OPERATION ALARM

Filed Aug. 8, 1951 3 Sheets-Sheet 3

INVENTOR.
G. H. RIDINGS

BY A. A. Thomas

ATTORNEY

United States Patent Office 2,742,526

Patented Apr. 17, 1956

2,742,526

TWO-WAY FACSIMILE SYSTEM WITH IMPROPER OPERATION ALARM

Garvice H. Ridings, Summit, N. J., assignor to The Western Union Telegraph Company, New York, N. Y., a corporation of New York Application August 8, 1951, Serial No. 240,913

15 Claims. (Cl. 178—6.6)

This invention is for a facsimile telegraph system for sending messages from one transceiver to another. That is to say, patrons who are subscribers to this service can send messages to each other by direct connection without the intervention of a central office operator.

The present system was especially designed for operation with a small optical transceiver like that disclosed in the pending application of Wise and others, Serial No. 224,926, filed May 7, 1951. For instance, these desk machines are placed in business offices which require speedy inter-communication, as between the main executive office of a big concern and its branches, or simply from one subscriber to another.

At each end of the system is a transceiver which has optical means for transmitting a message and a stylus for recording a received message. These machines are so easy to operate that an office clerk can do it. A message to be transmitted is wrapped around the drum of the machine and the attendant simply pushes a send button, which turns on the power and operates a buzzer in the other machine. In response to the buzzer, the patron who is to receive the message mounts a recording blank on his drum and presses the receive button.

The two machines are now connected for facsimile transmission, which continues until the complete message has been scanned at the transmitter end, whereupon the scanning mechanisms stop in both machines. Each machine has a stop button which is operated to turn off the power and place the machine in standby condition for the next operation, whether it be transmitting or recording.

The control units of this system are so designed that the machine first operated becomes a transmitter and the second machine that answers the call can only be set up as a receiver. If the patron of the called machine should press the send button by mistake, he would get a warning signal which would continue to sound until he pressed the receive button. In like manner, the machine can not be set up as a transmitter when the receive button is operated.

Figure 1:
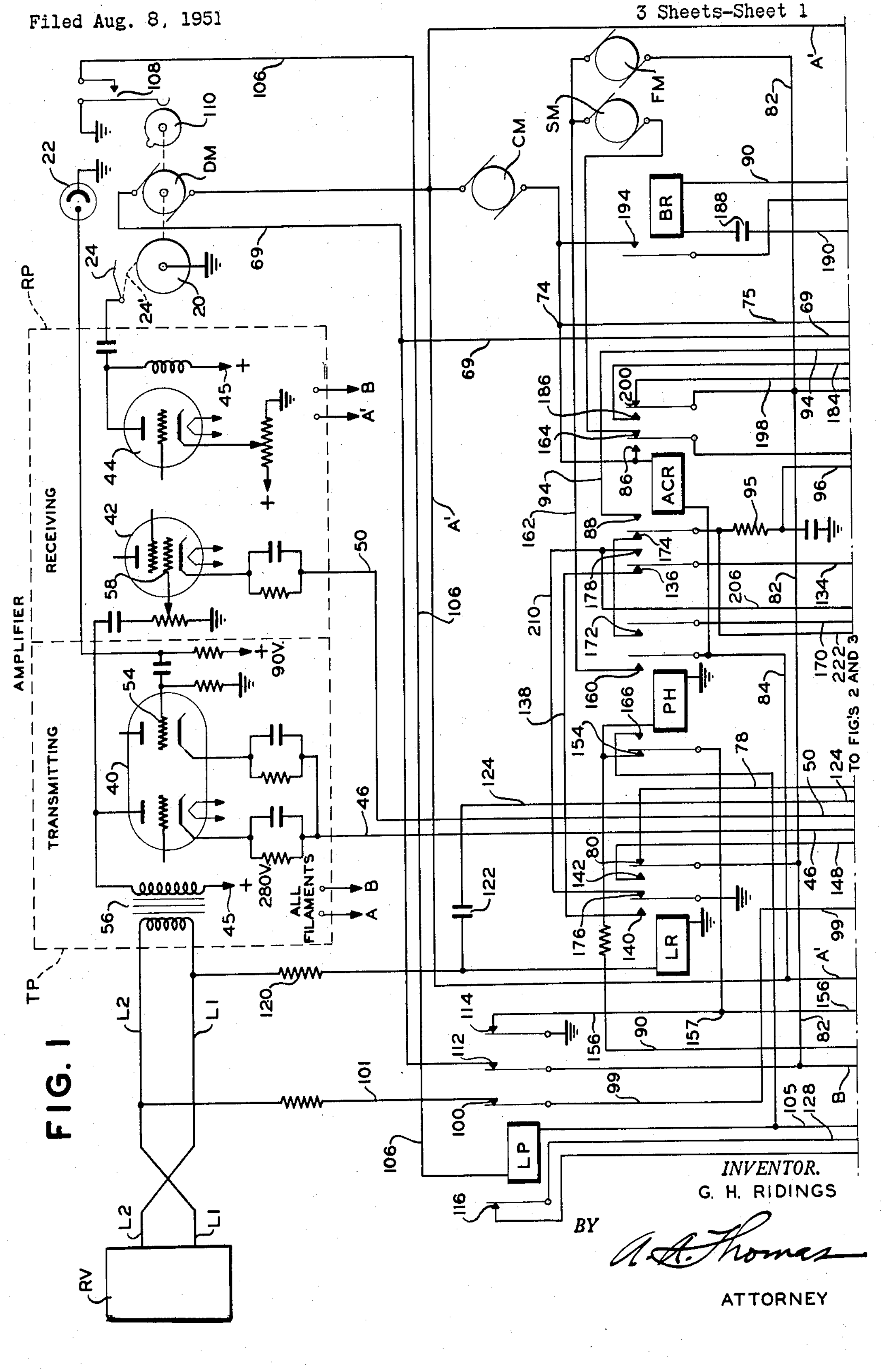
Figure 2:
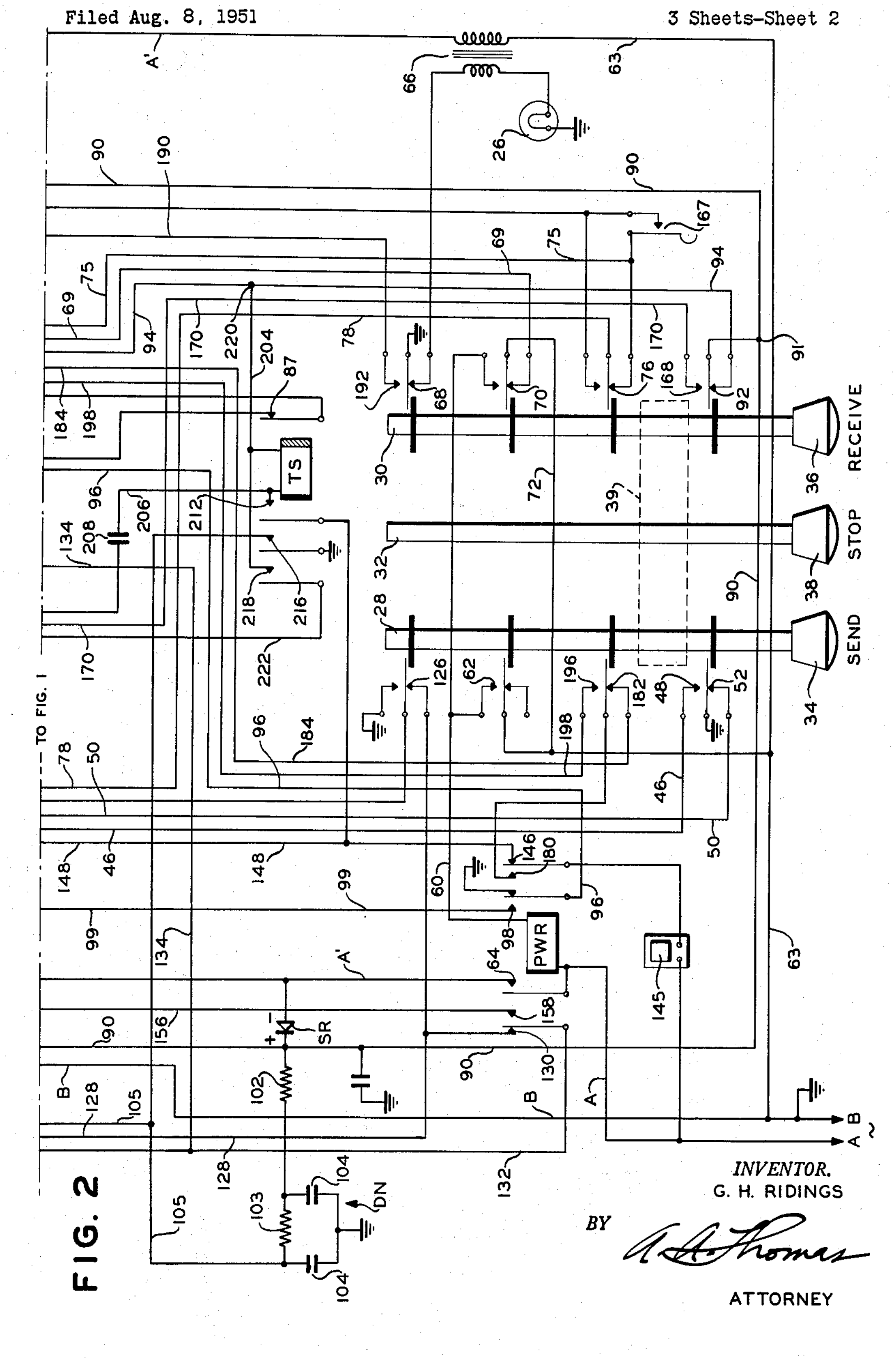
Figure 3:
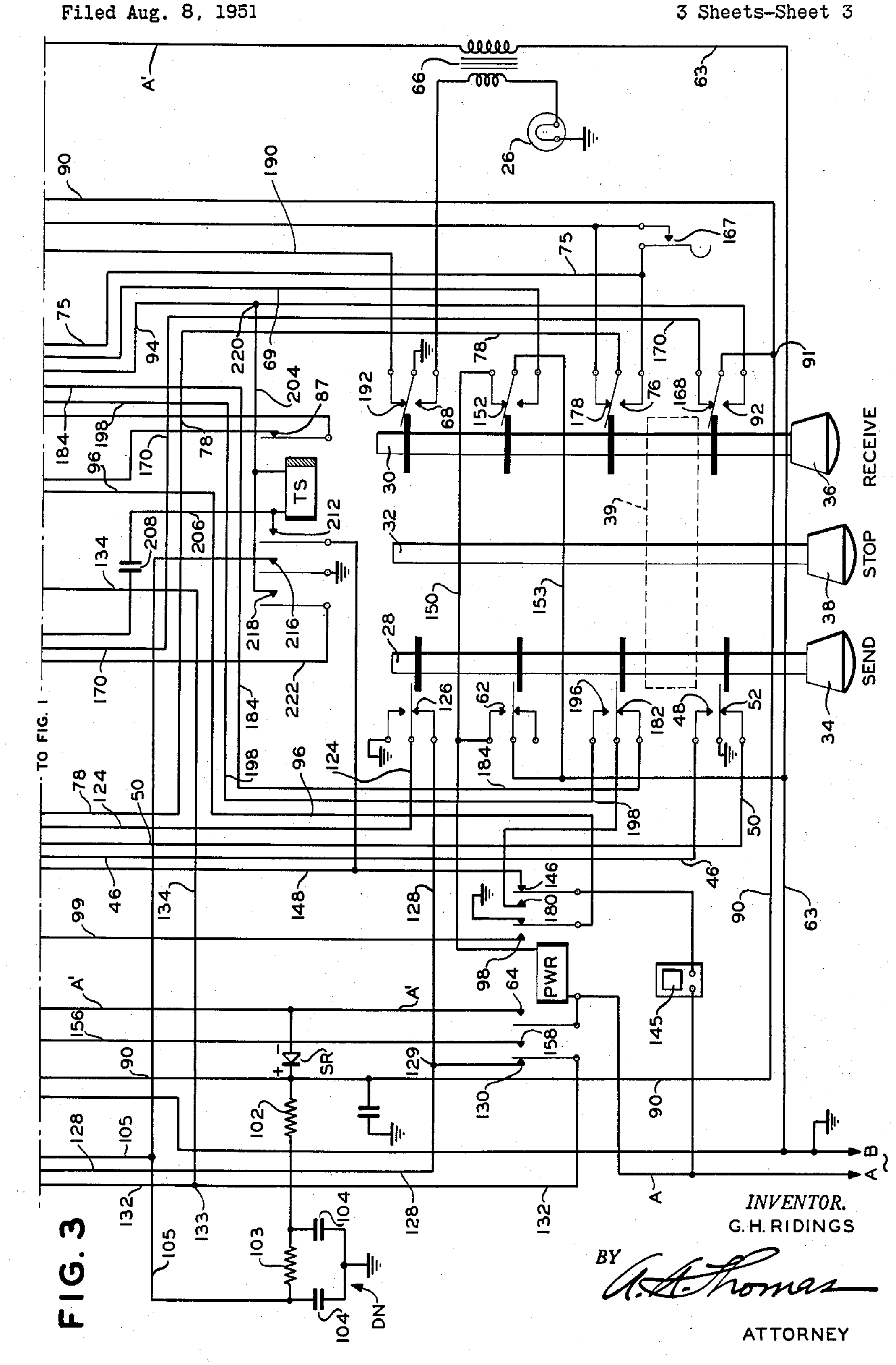

The novel features and practical advantages of our system will be fully understood from a description of the accompanying drawings in which Figs. 1 and 2 together disclose the transmitting and recording circuits associated with each transceiver. Fig. 3 is the same as Fig. 2 with the receive switch in operated condition to show the recording circuits when Fig. 3 is placed below Fig. 1.

Since the present case does not include any structural features of the transceiver which forms the subject of the aforesaid Wise application Serial No. 224,926, the drawings show diagrammatically only such parts of the machine as are needed for a description of the circuits.

Accordingly, in Fig. 1, the scanning apparatus is represented by a rotary drum 20 mounted to slide along its shaft, a motor DM for rotating the drum, a second motor FM for feeding the drum along its shaft during a scanning operation, a chopper motor CM for operating the usual chopper disk (not shown) associated with the photocell 22, and a stylus motor SM which moves the recording stylus 24 into contact with the blank on the drum. The exciter lamp of the optical scanning mechanism is shown at 26 in Figs. 2 and 3.

The transceiver is provided with an interlocking send-receive-stop switch represented schematically in Figs. 2 and 3 by three rods 28, 30 and 32 adapted to be operated by push buttons 34, 36 and 38, respectively. The construction of this switch is fully shown and described in the Wise application referred to and here we need only point out that the buttons 34 and 36 automatically remain in operated position and the operation of either button releases the other. We are to remember, then, that only one button can remain in operated position at a time. The automatic locking and releasing arrangement for the buttons 34 and 36 is indicated in Figs. 2 and 3 by the dotted rectangle 39, which represents a locking and releasing slide actuated by the buttons 43, 36 and 38. Each button 34 and 36 operates a set of contacts for controlling certain circuits, as will be described later, but the middle button 38 is for the sole purpose of releasing either one of the actuated buttons 34 and 36 to turn off the power.

The transceiver at each end of the system is plugged into a local source of power, such as a commercial 110 volt–60 cycle supply circuit, which is represented in the drawings by a pair of bus bars or mains A and B. In this case the side B is grounded for signaling purposes. The power circuit is completed only when the side A is connected to an auxiliary bus bar A′, as will be explained presently.

A suitable rectifier SR, which may be of the selenium type, has its negative side connected to A′ and provides the necessary D. C. or battery voltage for signal and control purposes. The signaling is done over a pair of transmission lines L1–L2 on a simple composite basis, one wire being used in each direction for the D. C. control signals, and the A. C. facsimile signals (usually of 2500 cycles) are superimposed on the lines through condensers.

The electrical equipment of each transceiver includes an amplifier composed of a transmitting section TP and a receiving section RP. This amplifier may be of any approved construction suitable for use in this system and we have shown only such parts as are needed to explain the circuit connections.

The form of amplifier we use at present has three stages in the sending section TP which contains a double triode 40, and two stages in the receiving section RP which includes a signal input tube 42 and an output tube 44. The terminals A′ and B represent the power input for both sections of the amplifier, and the plate voltage for all tubes comes from a rectifier (indicated by plus terminals 45) in the amplifier assembly. The filaments of all the tubes are always in circuit to keep the amplifier in standby condition.

The cathode conductor 46 of the transmitter tube 40 goes to a normally open contact 48 of the send button 34, and the cathode conductor 50 of the receiving input tube 42 is connected to a companion contact 52 which is normally grounded. Consequently, the machine is normally set up as a receiver. When the send button 34 is pushed in, the cathode circuit of the receiving amplifier RP is disconnected and the cathode circuit of the transmitting tube 40 is completed.

When the machine operates as a transmitter, the facsimile signals generated by the photocell 22 are impressed on the input grid 54 of the double triode 40, and the amplified signals pass into a line coupling transformer 56 which sends them over the lines L1—L2 to the machine at the receiving end.

When the machine is set up as a receiver, the incoming signals pass through the transformer 56 to the grid 58 of the input tube 42 in the receiving amplifier RP. The amplified signal output of tube 44 goes to the recording stylus 24. That is all we need to say about the operation of the double acting amplifier TP—RP, it being understood that this piece of apparatus represents any practical construction of amplifier as part of the transceiver equipment.

The circuits of the machine are controlled by seven relays whose functions, briefly defined, are as follows:

PWR is the main power relay for turning the power on the machine from the supply leads A—B when either one of the buttons 34 and 36 is operated.

ACR is a relay operating in conjunction with the setting-up buttons to prevent connection being made if the wrong button is pressed, at the same time sounding a buzzer as a warning.

LR is a line relay operated by battery pulses from the machine at the receiving end of the system.

LP is a local pulse relay energized momentarily once for each revolution of the drum shaft and adapted to operate in conjunction with the relay LR for the phasing of the machine.

PH is a phasing relay which comes into operation only when the pulses of relays LR and LP get in step.

BR is a safety relay which cooperates with relay ACR to prevent operation of the machine as a receiver when it is intended to operate as a transmitter.

TS is another safety relay adapted to prevent phasing if the send buttons of two transceivers are operated at substantially the same moment.

The relays PWR and ACR operate on alternating current, while the other five relays get direct current from the rectifier SR.

The circuits of these relays can be described best by explaining how the machine works as a transmitter and as a receiver. When we describe the machine as a transmitter, we shall refer to Fig. 2 in conjunction with Fig. 1, and for the circuits at the receiver end we shall use Fig. 3, where the receive button 36 is shown in operated position in response to a call from the distant transmitter.

To avoid confusion, we shall refer to the sending transceiver as the first machine and to the receiving transceiver as the second machine, which is indicated in Fig. 1 by the rectangle RV. Let it be noted that the transmission lines L1—L2 of the two machines are cross connected; that is, line L1 of each machine is connected to line L2 of the other.

*Operation of the transmitting transceiver*

Let us suppose that a patron has a message to send from his machine to that of another patron. After mounting the message on drum 20, he pushes the send button 34 which stays locked. This closes the circuit of power relay PWR from A to B through wire 60, closed switch contact 62 and conductor 63. The closed contact 64 of relay PWR connects the bus bar A to conductor A', thus energizing the amplifier, the drum motor DM, the chopper motor CM and the transformer 66 of the exciter lamp 26. The circuit of this lamp is closed through a switch 68 of the receive button 36, which is not operated in this instance.

The circuit of drum motor DM is completed from A' to B by way of conductor 69, a closed switch 70 of the receive button 36, and wires 72 and 63. The circuit of chopper motor CM goes from A' through the motor windings to point 74, through conductor 75, closed switch 76, wire 78, closed contact 80 of line relay LR (not energized) and through conductor 82 to bus bar B.

The relay ACR is energized from A' through wire 84, and at point 74 the circuit goes the same way as traced for the chopper motor CM. The relay ACR locks through its contact 86 and contact 87 of relay TS. The closed contact 88 of ACR completes a battery circuit from the plus terminal of rectifier SR, down wire 90 in Fig. 2 to point 91, closed switch 92 of the receive button 36 (not operated), wire 94, through relay contact 88, resistor 95, wire 96, closed contact 98 of energized relay PWR, wire 99, closed contacts 100 of relay LP, and by wire 101 to line L2, which is connected to line L1 of the second or receiving machine RV.

Positive battery from rectifier SR also goes through a delay network DN consisting of resistors 102—103 and condensers 104 over wire 105 through relay LP and by wire 106 through a switch 108 (when closed) to ground. The switch 108 is normally open and is closed briefly once for each revolution of the drum 20 by a commutator 110 mounted on or rotatable with the drum shaft.

The relay LP being briefly energized once for each turn of the transmitting drum, opens its contact 100 to interrupt the plus potential applied to line L2. The delay network DN prevents the commutator 110 from pulsing LP before the drum motor DM has reached its synchronous speed. It may be mentioned at this point that the three other contacts 112, 114 and 116 of the pulsing relay LP play no part when the machine operates as a transmitter. As will appear later, the short interruptions of the battery potential coming from the first machine are used at the distant second machine for phasing.

Summarizing the automatic operations that take place in the first machine when the send button is pressed, we have the following conditions:

The motor DM rotates the drum 20, the motor CM drives the chopper disk which interrupts the scanning beam for the photocell 22, and the exciter lamp 26 is turned on. In other words, the optical scanning mechanism is energized and standing by, but actual scanning has not begun because the feed motor FM is not yet operating. The stylus motor SM is not energized, so that the stylus 24 remains in withdrawn or inoperative position.

The synchronously interrupted positive potential caused by the pulsing relay LP goes over the line L2 of the transmitter to line L1 of the second machine, which responds to those pulses in the manner to be described. It may be mentioned in passing that the relay TS, which pulls up only for a second when the send button 34 is pressed, performs no function at this time and need not be considered. The purpose and operation of relay TS will be fully set forth under a subsequent heading.

*At the receiver*

For describing what takes place at the second machine, I shall use Fig. 3 in connection with Fig. 1.

The battery pulses from the transmitter enter line L1 of the second machine and energize the line relay LR through a resistor 120. The short interruptions of the battery circuits by the transmitter commutator do not affect the relay PH which remains energized steadily by the action of a condenser 122 shunted across the relay. The circuit of condenser 122 goes by wire 124 through the closed switch 126 of the send button 34 (not operated at the second machine), wire 128 to point 129, through closed contact 130 of relay PWR (not yet energized), wire 132 to point 133, from there by wire 134 through the closed contacts 136 of relay ACR (not energized) and by wire 138 through the closed contact 140 of energized relay LR to ground. Therefore, the line relay LR in the second machine does not at this time follow the pulses of relay LP at the first machine.

When the relay LR pulls up, its closed contact 142 completes the circuit of a buzzer 145 from power main A through the closed contact 146 of relay PWR, wire 148 and through relay contact 142 to conductor 82, which is connected to the grounded main B.

The sounding of buzzer 145 notifies the patron of the second machine that he is to receive a message. After placing a sheet of recording paper on the drum 20, he presses the receive button 36 which actuates the associated switches into the positions shown in Fig. 3. The operation of button 36 causes the energizing of relay PWR from the power main A through conductor 150, closed switch 152 and by wire 153 to bus bar B. The moment relay PWR operates, its opened contact 146 stops the buzzer.

The operation of relay PWR turns the power on for the machine, thereby energizing the amplifier and the drum motor DM. At this time, the chopper motor CM and the exciter lamp 26 are not energized because their circuits are open at the switch contacts 76 and 68, respectively, of the operated receive button 36.

It is important to note that the circuit of motor DM in the second or receiving machine closes through the contact 112 of relay LP. Since this relay pulses with the commutator 110, the motor circuit is briefly interrupted once for each revolution of drum 20. As a result, the motor DM is caused to drift—that is, run below synchronous speed—as long as the energized line relay LR does not respond to the phasing pulses from the distant transmitter. This steady energized condition of relay LR remains until the shunt condenser 122 is removed.

Let us hold in mind that relay LP in the transmitter operates synchronously, while relay LP in the receiver pulses at less than synchronous speed because its own motor DM is still drifting. There comes a time (in a few seconds) when the two relays get in step; that is, are energized at the same moment. When that happens, the contact 116 of the receiver relay LP opens and breaks the circuit of condenser 122, while at the same time the D. C. path from the transmitter is opened by its LP relay at contact 100. Consequently, at the receiver, contact 114 of relay LP and contact 140 of relay LR are opened the same time, whereby the local phasing relay PH is energized from the plus terminal of the rectifier SR.

The energizing of relay PH at the receiver is brought about by the removal of two grounds from the shorting path that normally shunts the relay winding through its own contact 154 and conductor 156 which goes to ground over two paths. One path goes from point 157 through contact 114 of relay LP, and the other path goes through contact 158 of the energized power relay PWR, wire 132 to point 133, wire 134, through closed contacts 136 of relay ACR (not energized), wire 138, and through the closed contact 140 of relay LR when the latter is energized.

Therefore, the opening of contact 114 by the energized relay LP simultaneously with the opening of contact 140 by the release of relay LR causes both shorting grounds of relay PH to be removed. Then, with the next revolution of the local commutator 110 and the subsequent operation of LP, the phasing relay PH will be energized.

When the receiver relay PH energizes, its closed contact 160 causes the stylus motor SM and the drum feed motor FM to be energized, their circuits going in parallel between conductors 82 and 162. The stylus motor SM is energized through the closed contact 164 of relay ACR (not energized). The closed contact 166 of relay PH places a ground around the coil of relay LP through its own contact 114, whereby LP is prevented from pulsing during transmission. Consequently, the contact 112 of LP remains closed and the drum motor DM of the receiver now runs at synchronous speed so that the receiver drum rotates in phase with the distant transmitter drum.

The called receiver is now in condition for recording, with the stylus in position 24' on the paper and the rotating drum moving axially along its shaft. After the drum has traveled a short distance (about one-half inch), it closes a switch 167 which stays closed until the drum returns to initial position. The function of switch 167 will be explained later.

At the receiver the energizing of relay PH causes steady positive battery to be applied to line L2 through the following circuit: From the rectifier SR (Fig. 3) along conductor 90, through the closed switch 168 of the operated receive button 36, wire 170, through the closed contact 172 of relay PH (Fig. 1) and the closed contact 174 of relay ACR (not energized) by wire 96 through closed contact 98 (Fig. 3) of PWR (energized), and by wire 99 through the closed contact 100 (Fig. 1) of relay LP (now deenergized) to the transmission line L2. This steady battery from the receiver extinguishes the phasing pulses sent out by the transmitter.

*How scanning starts at the transmitter after phasing of the receiver*

The positive potential impressed on line L2 at the receiver appears on line L1 at the transmitter, where it goes through resistor 120 and energizes the line relay LR which now operates for the first time and opens its grounded contact 176. This removes ground from a shunting circuit normally closed around relay PH through contact 178 of energized relay ACR, wire 134, through contact 158 of PWR (Fig. 2), wire 156 and contact 114 of relay LP. When this relay operates with the next revolution of commutator 110, its contact 114 is opened and breaks the shunting circuit around relay PH.

The transmitter phasing relay PH will now be energized and its closed contact 160 will cause the drum feed motor FM to operate, whereby the optical scanning of the message begins. The closed contact 166 of relay PH places a short circuit across the coil of relay LP to prevent its further operation.

The facsimile signals generated by the photocell 22 at the transmitter are recorded at the receiver by the stylus 24 in a manner so well understood as to require no description.

*At the close of a transmission*

When the transmitter drum 20 reaches the end of its axial travel after covering the width of the message sheet, the operated send button 34 is automatically released. In the transceiver here used we may assume that the scanning carriage strikes a pin on the send-receive switch to unlock the operated button, as fully shown and described in the Wise application referred to. In the case of a short message which does not require the full travel of the drum, the attendant can manually operate the stop button 38. In the broader aspect of my invention the stop button 38 can be a drum-actuated member for releasing the buttons 34 and 36.

Either way, the release of the send button 34 opens the circuit of relay PWR and disconnects power from the transceiver. The removal of power deenergizes the rectifier SR and the plus battery disappears from line L2 at the first machine and from line L1 at the second or receiving machine where the relay LR now releases. The release of line relay LR at the second machine causes the energizing of relay ACR for the first time, this circuit going from A' through wire 75 (Fig. 3), the closed carriage switch 167, the closed switch 178 of the receive button 36 (still pushed in), wire 78, and through the closed contact of relay LR (Fig. 1) to the bus bar B. The relay ACR locks through its own contact 86.

When the receiver relay ACR is energized, it closes the circuit of buzzer 145 from A through contact 180 of relay PWR (still energized), closed switch 182 of the send button 34 (not pushed in), wire 184, and through the closed contact 186 of ACR to B. The sounding of the buzzer notifies the patron that the message has been completed. The patron can now press the stop button 38 or let the drum continue to operate until it completes its travel and automatically releases the receive button 36. The return of this button to normal position turns off the power and shuts down the machine, so that the patron can remove the facsimile message from the drum.

*When the wrong button is operated*

When the patron at the first machine, wanting to transmit a message, operates the receive button by mistake, the energized relay PWR will cause the safety relay BR to be energized and that in turn will operate the relay ACR. The circuit of relay BR starts from the plus terminal of rectifier SR (Fig. 2), wire 90, through a condenser 188 (Fig. 1), and by wire 190 through switch 192 of the operated receive button 36 to ground. This charging current lasts only for a fraction of a second, long enough to close the circuit of relay ACR from A—B through the closed contact 194 of relay BR. The energized relay ACR closes the circuit of the buzzer 145 as described in the preceding paragraph. The sounding of the buzzer tells the patron that he has pressed the wrong button, and he will then operate the send button 34 which releases the receive button and places the machine in condition to transmit.

The same warning is given the patron at the second machine if he should, in response to a call, operate the send button 34 which will energize the relay PWR and close the buzzer circuit through relay contact 180, switch 196 of the send button 34, wire 198, and through the closed contact 200 of relay ACR (not energized) to the bus bar B. Therefore, the buzzer 145, which was energized by battery from the distant transmitter, will continue to sound after the send button 34 was pressed in error. This warns the patron of his mistake and he will now press the receive button 36, which stops the buzzer and conditions the machine for recording.

*The function of safety relay TS*

It may happen that each one of two subscribers wants to send a message to the other at the same time. If the two send buttons 34 are pressed simultaneously (that is, within a fractional second of each other) the relay TS operates and locks up to prevent phasing of the machines, so that neither can transmit to the other. This operation of relay TS will be clear from the following description.

One side of relay TS, which is of the slow-release type, is connected to the plus side of rectifier SR through conductor 90, closed switch contact 92 of the receive button 36, conductor 94, and wire 204. The other side of relay TS goes by wire 206 through a condenser 208 to the wire 210, which is connected at its ends to the relay contacts 176 and 178.

The relay TS is always energized when the send button 34 is pressed for transmitting, but that energized period lasts only one to two seconds (as I shall assume for example) due to the charging current through condenser 208. This charging circuit goes through the grounded contact 176 of the local line relay LR which is not energized at this time. When the relay TS thus pulls up for a second, the momentary closing of its contact 212 will not lock the relay because its circuit is open at contact 142 of relay LR (not energized). Therefore, under normal conditions, the momentary operation of relay TS when the send button 34 is pressed has no effect on the machine, which is therefore set up as a transmitter in the manner previously explained.

We have seen that when the transceiver is set up as a transmitter by the operation of its send button, battery pulses go over the line to the other machine where the relay LR is energized and operates the patron's buzzer as a calling signal. The time interval between the operation of the send button in the first machine and the energizing of relay LR in the second machine may be assumed for the purposes of this description to be 50 milliseconds (that is, $\frac{1}{20}$ of a second).

Now, suppose the patron of machine X wishing to transmit a message to machine Y, operates his send button; and further suppose that the patron of machine Y, before his relay LR energizes, presses his send button to transmit a message to machine X. Of course, neither patron knows what is happening at the other machine. Under these conditions the relay TS of the calling machine X will pull up for a second, long enough to let battery pulses go over the line as usual. However, in the called machine Y, whose relay LR is energized by the battery pulses from machine X, the relay TS locks up through its own contact 212, conductor 148, closed contact 142 of relay LR, and by wire 82 to bus bar B, which is the ground side of plus battery.

The locked-up relay TS at machine Y opens its contact 87 and releases the relay ACR, which was energized for a moment when the send button 34 of machine Y was pressed (before LR became energized). The closed grounded contact 216 of relay TS shorts out the relay LP, which is thus prevented from pulsing. At the same time, the closing of contact 218 of TS puts plus battery on line L2 of machine Y from the rectifier SR. This battery circuit goes through conductor 90, switch 92 of receive button 36 (not operated), wire 94 to point 220, closed relay contact 218, wire 222, through resistor 95, wire 96, closed contact 98 of energized relay PWR, wire 99, closed contact 100 of the dead relay LP, and by wire 101 to transmission line L2. As a result, the line relay LR of machine X will also be energized to lock up its relay TS.

We thus have the anomalous condition where each machine sends calling battery to the other at the same moment and causes relay TS of each machine to lock up in energized condition. This operates the buzzer of each machine through the closed contact 180 of the energized power relay PWR, closed switch contact 196 of the operated send button 34, wire 198, closed contact 200 of relay ACR (kept out of circuit by the open contact 87 of relay TS), and by wire 82 to the bus bar B. Normally, as we have seen, the buzzer 145 does not sound when the send button is pressed at the transmitter. Therefore, the continued sounding of the buzzer at each machine when the send button is operated is a warning to each subscriber that something is amiss, and one of them will turn off his machine first by operating his stop button 38.

Suppose, in the example cited, the patron of machine Y presses his stop button 38. This releases his send button 34 and turns the power off, thereby releasing relay TS and removing the battery from line L2. The opened contact 216 of TS unshorts the relay LP which now pulses the line current as under normal operation. The removal of battery from line L2 at machine Y releases the line relay LR at machine X, whereby its relay TS releases and shuts off the buzzer. Battery from the calling machine X continues to go over to machine Y, so that its buzzer 145 keeps on ringing as a calling signal. The patron of machine Y now places a recording blank on his drum and then presses the receive button 36. This automatically converts the two machines for transmission from X to Y in the usual operation of the system. If the patron of machine X had been the first to operate his stop button, the machine Y would have become the transmitter.

Summing up this special safety function of relay TS, it can be said that is protects the system from being fouled up by the simultaneous operation of the send buttons 34 in the two machines and prevents either machine from transmitting to the other. The patron who first presses the stop button clears the line and causes the other machine to revert automatically to its intended operation as a transmitter. If the line relay LR of either machine should operate at the instant when (or just before) its send button 34 is pressed, the relays ACR and TS will not stay energized, but the buzzer 145 will continue to sound as before.

It will be seen from the foregoing description that I have provided a simple system for sending a message in facsimile from one transceiver directly to another by merely presing a button at either machine after the drum has been loaded. That is to say, each setting-up button also operates as a start button. The interlocking switches controlled by the send and receive buttons prevent operation of the machine if the wrong button has been pressed by mistake, and the safety relay TS prevents two transceivers from being set up as transmitters at the same time. To that extent, therefore, my system is foolproof.

The specific circuits set forth in the present embodiment of my invention are susceptible of modifications within the scope of the appended claims. It is hardly necessary to add that the convenient term "button" as used in the claims stands for any kind or form of fingerpiece for operating the associated send-receive switches.

I claim as my invention:

1. In a two-way facsimile system, two similar transceivers connected by a transmission line, a send button and a receive button for each transceiver, said buttons being separately operable, a signal for each transceiver, circuit means responsive to the operation of the send button at the first machine for setting up that machine as a transmitter and sending battery pulses over the line to the second machine, circuits energized by the operation of the receive button at the first machine for operating said signal as a warning that the wrong button has been pressed, and means whereby said circuits prevent the sending of battery pulses to the second machine upon the operation of the receive button in the first machine.

2. In a two-way facsimile system, two similar transceivers connected by a transmission line, a send button and a receive button for each transceiver, said buttons being separately operable, means responsive to the operation of the send button at the first machine for setting up that machine as a transmitter, a signal at the second machine, means responsive to the operation of said transmitter send button for energizing said signal, circuit means responsive to the operation of the receive button at the second machine to set up that machine as a recorder and disconnect said signal, and means whereby the operation of a send button at the second machine in response to said signal causes the signal to remain energized until the receive button is pressed.

3. In a two-way facsimile system, two similar transceivers connected by a transmission line, each transceiver being provided with a send button and a receive button which are individually operable, means for automatically setting up the first machine as a transmitter when its send button is operated, said means including circuits for sending battery pulses over the line to the second machine, a signal at the second machine energized in response to said battery pulses, means at the second machine including a relay responsive to the operation of its receive button for automatically setting up that machine as a recorder, and a circuit controlled by said relay for stopping said signal as an indication of the recording condition of said machine.

4. In a two-way facsimile system, two similar transceivers connected by a transmission line, each transceiver being provided with a send button and a receive button which are individually operable, means for automatically setting up the first machine as a transmitter when its send button is operated, said means including circuits for sending battery pulses over the line to the second machine, a signal at the second machine energized in response to said battery pulses, means at the second machine including a relay responsive to the operation of its receive button for automatically setting up that machine as a recorder, a circuit controlled by said relay for stopping said signal as an indication of the recording condition of said machine, and switch means at the second machine controlled by the inadvertent operation of its send button to prevent said relay from setting up that machine as a recorder and from stopping said signal, whose continued operation indicates the use of the wrong button.

5. In a two-way facsimile system, two similar transceivers connected by a transmission line, each transceiver being provided with transmitting equipment and recording equipment, a send button and a receive button for each transceiver, a set of switches actuated by each button, only one of which can be in operated position at a time, circuits controlled by the switches of the operated send button for energizing the transmitting equipment and setting up the first machine as a transmitter, means energized in response to the operation of the send button for placing battery pulses on the line, a line relay at the second machine energized by said battery pulses, a signal at the second machine operated by the energized relay, means at the second machine including a power relay controlled by the switches of the operated receive button for energizing the recording equipment and setting up the second machine as a receiver, means whereby the energizing of said power relay stops said signal, and means for preventing said energized power relay from stopping the signal when the send button is operated by mistake in the second machine.

6. In a two-way facsimile system, two similar transceivers connected by a transmission line, each machine having a send button and a receive button, stop means on each machine for turning it off, circuit connections whereby the simultaneous operation of both send buttons prevents both machines from operating as transmitters, means whereby the operation of the stop means on the first machine automatically causes the other machine to set up as a transmitter, and means responsive to the operation of the receive button on the stopped machine for automatically setting up that machine as a receiver.

7. In a two-way facsimile system, two similar transceivers connected by a transmission line, each transceiver having a send button and a receive button, a line relay and a safety relay in each transceiver, means responsive to the operation of the send button of one machine for putting battery on the line to energize the line relay of the other machine, a signal operated by the energized line relay of said other machine, connections whereby the operation of the send button in said other machine before its line relay pulls up causes the associated safety relay to stay energized, and means whereby the operation of the safety relay in said other machine prevents the first machine from being set up as a transmitter.

8. In a two-way facsimile system, two similar transceivers connected by a transmission line, each machine having a send button and a receive button, a signal for each machine, circuit connections whereby the simultaneous operation of both send buttons energizes both signals, means whereby the receive button that is first operated causes the signal of the other machine to shut down, and means responsive to the operation of said first receive button for automatically conditioning the associated machine as a receiver and simultaneously conditioning the other machine as a transmitter.

9. In a two-way facsimile system, two similar transceivers connected by a transmission line, a send button and a receive button for each machine, means responsive to the operation of the send button for setting up the machine as a transmitter, means responsive to the operation of the receive button for setting up the machine as a receiver, relay controlled means responsive to the simultaneous operation of the send buttons in the two machines for preventing both machines from being set up as transmitters, and means whereby the operation of the receive button in one machine automatically converts that machine into a receiver and converts the other machine into a transmitter.

10. In a two-way facsimile system, two similar transceivers connected by a transmission line, each transceiver having a rotary drum and a synchronous motor for operating said drum, a send button and a receive button for each machine, means responsive to the operation of the send button in the first machine to set the same up as a transmitter and cause its motor to run at synchronous speed, means responsive to the operation of the receive button at the second machine for setting the same up as a recorder and causing the circuit of its motor to be periodically interrupted whereby said motor runs below synchronous speed, and phasing means jointly controlled by the synchronous speed of the transmitting drum and by the sub-synchronous speed of the recording drum to prevent the interruption of the motor circuit in the second machine whereby the recording motor is caused to run in synchronism with the transmitting motor.

11. In a two-way facsimile system, two similar transceivers connected by a transmission line and having each a local source of power, each transceiver being provided with transmitting equipment and recording equipment, a send button and a receive button for each transceiver, a set of switches actuated by each button, only one of which can be in operated position at a time, circuits in the first machine controlled by the switches of its operated send button for automatically connecting its transmitting equipment to the local source of power and setting that machine up as a transmitter, circuits in the second machine controlled by the switches of its operated receive button for automatically connecting its recording equipment to the local source of power and setting that machine up as a recorder, and means on each machine for releasing its setting-up button and disconnecting the machine from its source of power.

12. In a two-way facsimile system, two similar transceivers connected by a transmission line and having each a local source of power, each transceiver being provided with transmitting equipment and recording equipment, a power relay for each transceiver adapted when energized to connect the selected equipment to its source of power, a send button and a receive button for each transceiver, a set of switches actuated by each button, only one of which can be in operated position at a time, circuits in the first machine controlled by the switches of its operated send button to energize its power relay and connect the transmitting equipment with the local source of power, circuits in the second machine controlled by the switches of its operated receive button to energize its power relay and connect the recording equipment with the local source of power, and a stop button on each machine for deenergizing its power relay to disconnect the machine from its source of power.

13. In a two-way facsimile system, two similar transceivers connected by a transmission line, each transceiver being provided with transmission equipment and recording equipment, setting-up switches for each transceiver controlled by a send button and a receive button which are separately operable, means controlled by said switches when the send button of the first machine is operated to energize the transmitting equipment and send battery pulses over the line to the second machine, a relay at the second machine energized by said battery pulses, a signal at the second machine operated by said energized relay, means including another relay at the second machine controlled by said switches when the receive button is operated to energize the recording equipment of the machine and stop said signal, means at the second machine for causing the battery pulses of the first machine to become steady battery, and means at the first machine energized by said steady battery to start scanning by the transmitting equipment.

14. In a two-way facsimile system, two similar transceivers connected by a transmission line, each transceiver being provided with transmission equipment and recording equipment, setting up switches for each transceiver controlled by a send button and a receive button which are separately operable, means controlled by said switches when the send button of the first machine is operated to energize the transmitting equipment and send battery pulses over the line to the second machine, a relay at the second machine energized by said battery pulses, a signal at the second machine operated by said energized relay, means including another relay at the second machine controlled by said switches when the receive button is operated to energize the recording equipment of the machine and stop said signal, a third relay at the second machine, circuits controlled by said battery pulses from the first machine to cause energizing of said third relay, means responsive to the energizing of said third relay for causing the battery pulses of the first machine to become steady battery, and means at the first machine energized by said steady battery to start scanning by the transmitting equipment.

15. In a two-way facsimile system, two similar transceivers connected by a transmission line, each transceiver having a rotary scanning drum and a synchronous motor for operating said drum, a send button and a receive button for each machine, a pulse relay for each machine, circuit connections for briefly operating said relay once for each revolution of the drum, a normally closed contact opened by said relay when energized, two circuit paths for connecting said motor with a local source of power, one of said paths going through said relay contact and the other path being closed independently thereof, means responsive to the operation of the send button at the first machine for setting up that machine as a transmitter and causing its motor to run at synchronous speed through said independent path, means responsive to the operation of the receive button at the second machine for setting up that machine as a recorder and energizing its motor through said pulsing relay contact, whereby the receiver drum rotates at less than synchronous speed, and phasing connections energized in response to the operation of said receive button for deenergizing the pulse relay of the second machine, whereby its drum motor operates at synchronous speed.

References Cited in the file of this patent

UNITED STATES PATENTS

| | | |
|---|---|---|
| 2,356,116 | Ridings | Aug. 15, 1944 |
| 2,365,741 | Wise et al. | Dec. 26, 1944 |
| 2,374,704 | Ridings et al. | May 1, 1945 |
| 2,524,651 | Cooley | Oct. 3, 1950 |
| 2,567,307 | Wise et al. | Sept. 11, 1951 |
| 2,616,963 | Ridings | Nov. 4, 1952 |